N. C. Burnap,
Milk Pan.
No. 99,150.    Patented Jan. 25. 1870.
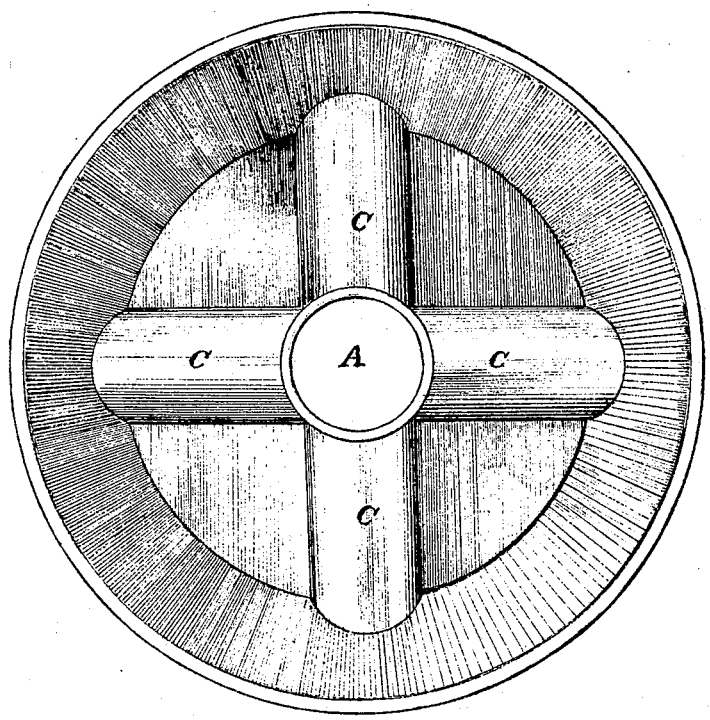
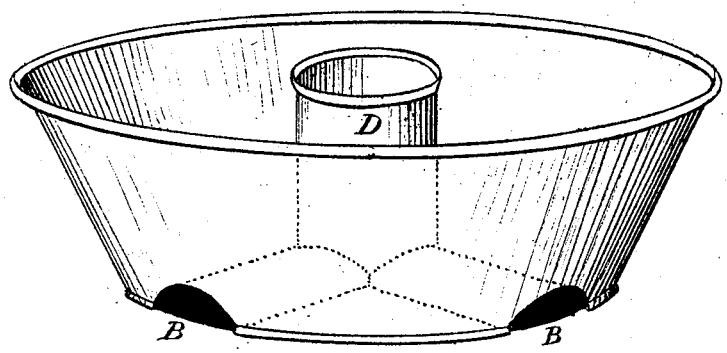
Witnesses,    Inventor,

United States Patent Office.

NELSON C. BURNAP, OF ARGUSVILLE, NEW YORK.

Letters Patent No. 99,150, dated January 25, 1870.

IMPROVEMENT IN MILK-PANS.

The Schedule referred to in these Letters Patent and making part of the same

*To all whom it may concern:*

Be it known that I, NELSON C. BURNAP, of Argusville, in the county of Schoharie, and in the State of New York, have invented Milk-Pans; and do hereby declare that the following description, taken in connection with the accompanying plate of drawings hereinafter referred to, forms a full and exact specification of the same, wherein I have set forth the nature and principles of my said improvement, by which my invention may be distinguished from others of a similar class, together with such parts as I claim, and desire to secure by Letters Patent.

The nature of my invention consists in constructing pans for holding milk, with passages through which air and water can pass, or in which ice can be placed, in order to facilitate the cooling of the milk, and in so arranging the said passages, that when the pans are properly placed on top of each, the air can circulate freely through and about them.

In the accompanying plate of drawings, which illustrates my invention, and forms a part of the specification thereof—

Figure 1 is a perspective view of a milk-pan of the ordinary form, with my invention applied thereto, and Figure 2, a plan of the same.

The construction of my invention is as follows, to wit:

A circular perforation, A, is cut in the bottom of the pan, and semicircular apertures B, through the lower parts of the sides thereof.

To the edges of the apertures B, and to the bottom of the pan, are soldered, or otherwise secured, the semi-cylinders *c*.

A cylindrical tube, D, whose altitude equals the height of the pan, is secured, in an upright position, in the centre thereof, the lower edge of the said cylinder and the inner edges of the semi-cylinders *c* being cut in such a manner that the said edges may be soldered together.

The operation and advantages of my invention are as follows:

The annular space within the pan having been filled with warm milk, the particles of air within the semi-cylindrical conductors *c* and the upright cylindrical tube D become warmed by the heat radiated from the milk, and, being thus rendered lighter than the particles composing the extraneous air above the pan, rise, convectively, through the funnel D.

Cold air then rushes in through the semicircular apertures B and perforation A, in the bottom of the pan, to fill the vacuum, and then a constant circulation is produced, and the heat contained in the milk rapidly radiated.

When it is desirable to lower the temperature of the milk below that of the air, the pan may be placed in a trough containing cold water, or ice may be placed in the tube D.

A large number of pans, constructed as aforesaid, may be stacked together, by placing them one above the other, in such a manner that the edges of the bottoms thereof rest, partially, on the upper edges of the centre tube.

Having thus described the nature, construction, operation, and advantages of my invention, I will proceed to indicate what I claim, and desire to secure by Letters Patent, in the following clause:

In combination with a milk-pan, the semi-cylindrical conductors *c* and upright cylinder D, when constructed to operate as described.

In testimony that I claim the foregoing, I have hereunto set my hand, this 28th day of September, 1869.

NELSON C. BURNAP.

Witnesses:
C. ICHERS,
S. GORDON.